(12) United States Patent
Hou (10) Patent No.: US 10,422,918 B2
(45) Date of Patent: Sep. 24, 2019

(54) DATA-QUALITY EVALUATION OF CALCULATED TRUE RESERVOIR RESISTIVITY

(71) Applicant: Halliburton Energy Services, Inc., Houston, TX (US)

(72) Inventor: Junsheng Hou, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 43 days.

(21) Appl. No.: 15/512,418

(22) PCT Filed: Apr. 26, 2016

(86) PCT No.: PCT/US2016/029332
§ 371 (c)(1),
(2) Date: Mar. 17, 2017

(87) PCT Pub. No.: WO2017/188933
PCT Pub. Date: Nov. 2, 2017

(65) Prior Publication Data
US 2018/0172875 A1     Jun. 21, 2018

(51) Int. Cl.
*G01V 3/38*     (2006.01)
*G01V 3/20*     (2006.01)
*G01V 11/00*    (2006.01)

(52) U.S. Cl.
CPC ............... *G01V 3/38* (2013.01); *G01V 3/20* (2013.01); *G01V 11/00* (2013.01)

(58) Field of Classification Search
CPC . G01V 11/00; G01V 3/28; G01V 3/32; G01V 3/38
See application file for complete search history.

(56) References Cited

U.S. PATENT DOCUMENTS 6,470,274 B1 * 10/2002 Mollison .................. G01V 3/28
                                                                702/12
7,157,915 B2 *  1/2007 Schoen .................... G01V 3/32
                                                                324/303

(Continued)

OTHER PUBLICATIONS

International Search Report and Written Opinion dated Jan. 25, 2017; International PCT Application No. PCT/US2016/029332.
Moran, J. H., and S. Gianzero. "Effects of formation anisotropy on resistivity-logging measurements." Geophysics 44.7 (1979): 1266-1286.

(Continued)

*Primary Examiner* — Elias Desta
(74) *Attorney, Agent, or Firm* — McGuireWoods LLP (57) ABSTRACT

Disclosed herein are embodiments of systems, methods, and computer program products for assessing the data-quality of the calculated reservoir-rock resistivity $R_{sd}$ in laminar formations. For instance, in one embodiment, a computer-implemented method for assessing the data-quality of the calculated reservoir-rock resistivity $R_{sd}$ in laminar formations comprises the steps of receiving multi-component induction (MCI) data and other sensor logs data associated with a laminar formation; determining a set of calculated reservoir-rock resistivity $R_{sd}$ using at least one of the multi-component induction (MCI) data and other sensor logs data; and performing data quality assessments of the set of calculated reservoir-rock resistivity $R_{sd}$.

18 Claims, 7 Drawing Sheets

(56) References Cited

U.S. PATENT DOCUMENTS

| | | |
|---|---|---|
| 2007/0239360 A1 | 10/2007 | Rabinovich et al. |
| 2007/0267192 A1 | 11/2007 | Wang et al. |
| 2009/0287416 A1 | 11/2009 | Minh |
| 2010/0004866 A1 | 1/2010 | Rabinovich et al. |
| 2015/0355367 A1 | 12/2015 | Khoo et al. |

OTHER PUBLICATIONS

Mollison, R. A., et al. "A model for hydrocarbon saturation determination from an orthogonal tensor relationship in thinly laminated anisotropic reservoirs." SPWLA 40th Annual Logging Symposium. Society of Petrophysicists and Well-Log Analysts, 1999.

Quirein, John, et al. "Evaluation of general resistivity density-based saturation in thin, laminated sand-shale sequences." AAPG Int. Conf. Exhib."Asia Pacific Resources: Fueling the Future", Sep. 16-19, 2012, Singapore. 2012.

Hou, Junsheng, et al. "A new multi-frequency triaxial array induction tool for enhancing evaluation of anisotropic formations and its field testing." SPWLA 54th Annual Logging Symposium. Society of Petrophysicists and Well-Log Analysts, 2013.

Xiao, Jiaqi, et al. "A new asymmetrical array induction logging tool." SPE Annual technical conference and exhibition. Society of Petroleum Engineers, 2006.

San Martin, L., et al. "Oil-based mud imaging tool generates high quality borehole images in challenging formation and borehole condition, including thin beds, low resistive formations, and shales." 49th Annual Logging Symposium. Society of Petrophysicists and Well-Log Analysts, 2008.

Bootle, Richard Joseph Robin, et al. "Laminated Sand Shale Formation Evaluation Using Azimuthal LWD Resistivity." SPE Annual Technical Conference and Exhibition. Society of Petroleum Engineers, 2009.

\* cited by examiner

DATA-QUALITY EVALUATION OF CALCULATED TRUE RESERVOIR RESISTIVITY

BACKGROUND

The present disclosure relates to oil and gas exploration and production, and more particularly to systems and methods for performing data-quality evaluation of calculated true reservoir resistivity (or conductivity) with integrated interpretation of multi-component induction (MCI), array compensated true resistivity (ACRt), and imager logs.

Both MCI and conventional array resistivity logging such as ACRt logging have been extensively used in laminar formation evaluation, especially for solving low-resistivity reservoirs in deep-water area. From various interpretation models, the reservoir-rock resistivity and other petrophysical parameters can be more accurately determined, which leads to more accurate water/hydrocarbon assessment in formation reservoirs. However, most interpretation methods currently have no capability to provide the data-quality assessment of calculated reservoir-rock parameters such as reservoir resistivity. The past applications have shown that the users or client are also interested in having the information about the data-quality of all calculated petrophysical parameters.

To fill this gap, this disclosure describes systems, methods, and computer program products that are configured for the data-quality assessment of the calculated reservoir-rock resistivity (or sand resistivity) with integrated interpretation of the MCI, ACRt, and macro-resistivity imager logs in laminar formations. More importantly, if only the conventional array induction is available, the disclosed embodiments describe new approaches for the calculation of the true resistivity.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 7A-7D are diagrams depicting synthetic data examples according to a disclosed embodiment.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, and electrical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity. In addition, as used herein, the singular forms "a", "an" and "the" are intended to include the plural forms as well, unless the context clearly indicates otherwise.

Unless otherwise specified, any use of any form of the terms "connect," "engage," "couple," "attach," or any other term describing an interaction between elements is not meant to limit the interaction to direct interaction between the elements and may also include indirect interaction between the elements described. Additionally, the variables expressed in any formula recited in the claims shall have the meaning as defined in the specification.

The following written description discloses an innovative approach for performing data-quality (DQ) evaluation of calculated reservoir-rock true resistivity (or sand resistivity) with integrated interpretation of multi-component induction (MCI), conventional array induction such as ACRt, and macro-resistivity imager logs in laminar formations. In addition, the disclosed embodiments described herein propose new ways for $R_{sd}$ determination if the MCI is not available.

Figure 1A:
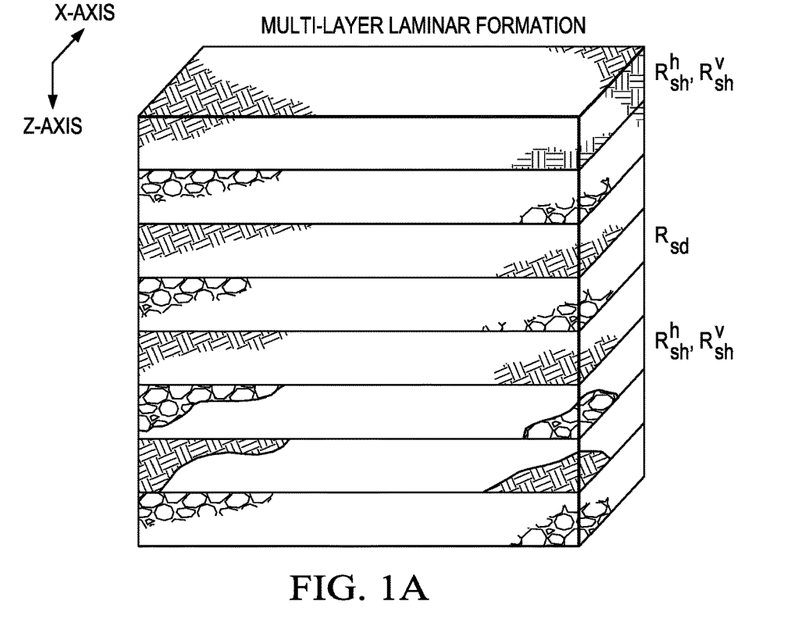
FIG. 1 is a diagram depicting an example of a bimodal rock-physics model consisting of isotropic reservoir rock (e.g., sand) and transversely isotropic (TI) shale according to a disclosed embodiment.
Figure 1B:
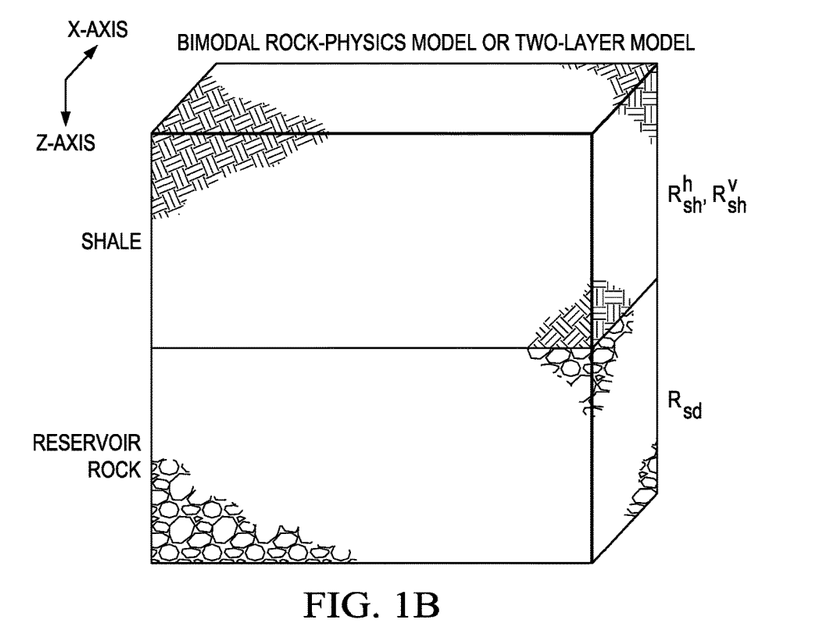

Referring now to the drawings, FIGS. 1A and 1B are diagrams depicting an example of a bimodal rock-physics model consisting of isotropic reservoir rock (e.g., sand) and transversely isotropic (TI) shale according to a disclosed embodiment. FIG. 1A depicts a multi-layer laminar formation, while FIG. 1B depicts a two-layer model (bimodal) rock-physics model. In the depicted embodiments, $R_{sh}^{h}$ and $R_{sh}^{v}$ are the horizontal and vertical resistivities of the pure shale formation, and $R_{sd}$ is the sand-formation resistivity.

Figure 2:
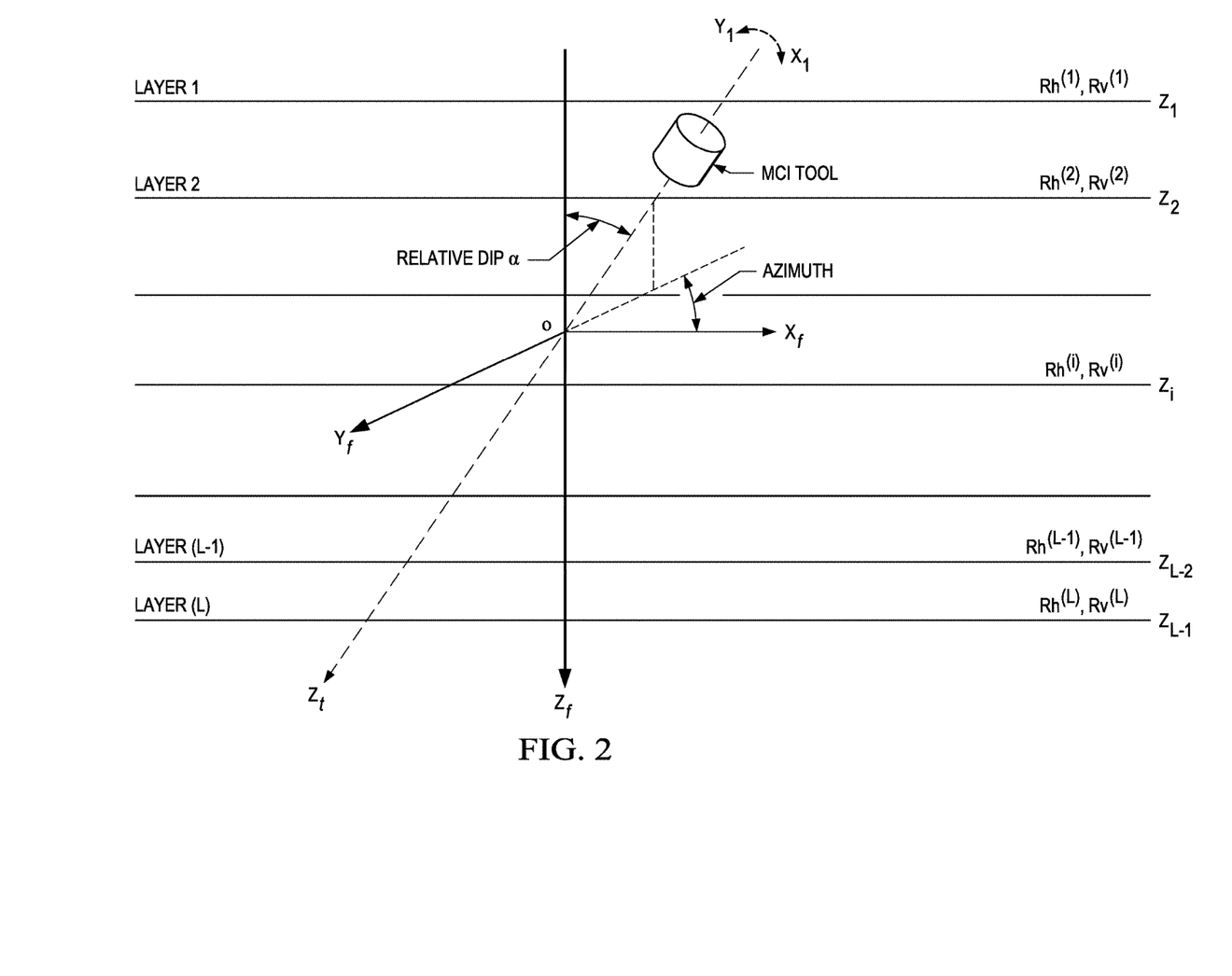
FIG. 2 is a schematic diagram depicting a vertically one-dimensional (V1D) formation model with TI anisotropy according to a disclosed embodiment.

FIG. 2 is a schematic diagram depicting a vertically one-dimensional (V1D) formation model with TI anisotropy according to a disclosed embodiment. In particular, FIG. 2 illustrates a basic formation model for inverting horizontal resistivity $R_h$ and vertical resistivity $R_v$ with MCI or ACRt log data, as shown in equation (2.2-1) below. Horizontal resistivity $R_h$ is defined in the direction of layering, and vertical resistivity $R_v$ is perpendicular to $R_h$. In the depicted embodiment, if an assumption is made that $R_h^{(i)}=R_v^{(i)}$ for each bed/layer (i 1, 2, ..., L), then it is a V1D isotropic formation model.

Figure 3:
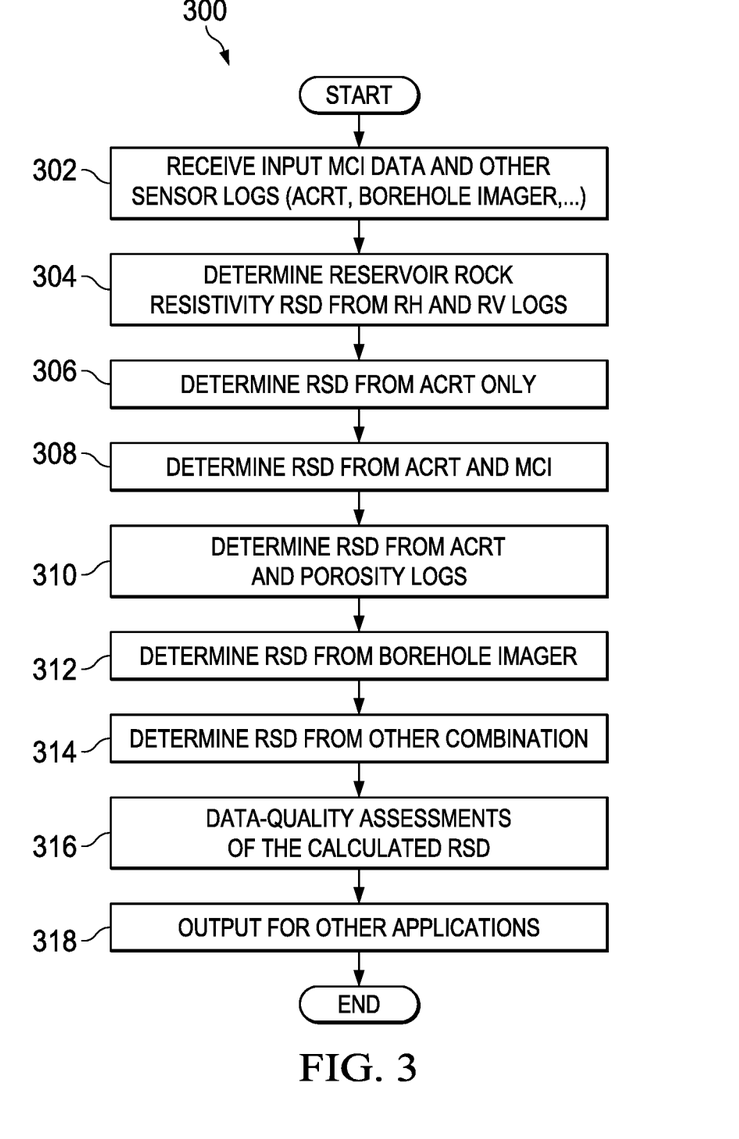
FIG. 3 is a flow diagram depicting an example of a process for assessing the data-quality of calculated reservoir-rock resistivity $R_{sd}$ with integrated interpretation of MCI, ACRt, and macro-resistivity imager logs in laminar formations according to a disclosed embodiment.

FIG. 3 is a flow diagram depicting an example of a process 300 for calculating reservoir-rock resistivity $R_{sd}$ in laminar formations using various methods as disclosed herein and assessing the data-quality of the calculated $R_{sd}$ according to a disclosed embodiment. The process 300 is implemented by a system having at least a processor for executing instructions, memory and/or other data storage component for storing data and executable instructions, and a network interface configurable to receive data from one or more devices. An example of such a system will be further described in FIG. 8. Although, FIG. 3 illustrates a particular sequence for performing the steps of calculating reservoir-rock resistivity $R_{sd}$, it should be noted that the various methods disclosed herein for calculating reservoir-rock resistivity $R_{sd}$ may be performed in any sequence, and one or more of the indicated methods for calculating reservoir-rock resistivity $R_{sd}$ may be omitted.

In the depicted embodiment, the process 300 begins at step 302 by receiving as input MCI data and other sensor logs such as, but not limited to, ACRt logs, borehole imager logs, etc. The MCI data is received from an MCI tool such as, but not limited to, Halliburton's Xaminer$^{SM}$ Multicomponent Induction (MCI) service, which is configured to measure resistivity both vertically and horizontally of a formation at different depths of investigation. In some embodiments, when run with a directional instrument, the tool provides structural dip and azimuth. This data may be received in real-time during the drilling process or may be received after the drilling process. In certain embodiments, the MCI tool and other sensors may be configured to automatically send the MCI data to the disclosed system and/or the system may be configured to retrieve the data from the MCI tool and other sensors. For example, in certain embodiments, in borehole logging, data may be obtained from different tool measurements, such as, but not limited to, MCI logging, ACRt logging, density and neutron logging, nuclear magnetic resonance (NMR) logging, etc. The main purpose for the density and neutron logging and NMR logging is to determine formation rock porosity. The ACRt logs may be obtained from one or more tools such as, but not limited to, Halliburton's LOGIQ® Array Compensated Resistivity Tool (ACRt™) logging system or Halliburton's Hostile Array Compensated True Resistivity (H-ACRt™). The borehole imager logs may be obtained from one or more types of devices/logging tool using one or more imaging techniques such as, but not limited to, optical imaging, acoustic imaging, electrical imaging, and methods that draw on both acoustic and electrical imaging techniques.

At step 304, the process performs a determination of reservoir-rock resistivity $R_{sd}$ from $R_h$ and $R_v$ logs. In one embodiment, $R_h$ and $R_v$ logs are firstly obtained from the inversion of the MCI tool measurements, and then $R_{sd}$ is determined from $R_h$ and $R_v$ logs. For instance, in one embodiment, based on the bimodal rock-physics model as shown in FIG. 1, the process is configured with the following equations in a laminar formation:

$$\frac{1}{R_h} = \frac{(1-V_{lam})}{R_{sd}} + \frac{V_{lam}}{R_{sh}^h}, \text{ or} \quad (2.1-1)$$

$$C_h = \frac{(1-V_{lam})}{R_{sd}} + \frac{V_{lam}}{R_{sh}^h} = (1-V_{lam}) \cdot C_{sd} + V_{lam} \cdot C_{sh}^h.$$

-continued $$R_v = (1-V_{lam}) \cdot R_{sd} + V_{lam} \cdot R_{sh}^v. \quad (2.1-2)$$

$$V_{sd} = 1 - V_{lam}. \quad (2.1-3)$$

Here $R_h$ (or $C_h=1/R_h$) is the horizontal resistivity (or conductivity), $R_v$ (or $C_v=1/R_v$) is the vertical resistivity (or conductivity) of formation, $V_{lam}$ is the volumetric fraction of laminated shale, $V_{sd}$ is the volumetric fraction of sand, $R_{sh}^h$ ($C_{sh}^h=1/R_{sh}^h$) is the horizontal resistivity (or conductivity) of the pure shale formation, $R_{sh}^v$ is the shale vertical resistivity, and $R_{sd}$ (or $C_{sd}=1/R_{sd}$) is the sand or reservoir-formation resistivity.

As can be seen from equations (2.1-1) and (2.1-2), $R_h$ is a function of variables $V_{lam}$, $R_{sd}$, and $R_{sh}^h$; and $R_v$ is a function of variables $V_{lam}$, $R_{sd}$, and $R_{sh}^v$.

In one embodiment, $R_h$ and $R_v$ are obtained from the MCI inversion processing based on the MCI logging measurements, and $R_{sh}^h$ and $R_{sh}^v$ are known from the MCI logs in pure shale sections. The process is then configured to solve for $V_{lam}$ and $R_{sd}$ from equations (2.1-1) and (2.1-2). Here $R_{sd}$ is the first solution, denoted as $R_{sd}^{(1)}$.

At step 306, in one embodiment, if only ACRt log is available, the process performs a determination of reservoir-rock resistivity $R_{sd}$ from the ACRt log only. In this case, the process is configured to obtain $R_h$, $R_v$, and dip by using the ACRt measurements. For example, in one embodiment, the process is configured to implement the induction-logging forward modeling in which the ACRt conventional apparent resistivity log after borehole correction and skin-effect correction is a function of formation resistivity and relative dip in a multi-layer or vertically one-dimensional (V1D) formation (see FIG. 2), as represented by the below equation:

$$R_a(z)=f_{Ra}(z,\overline{\overline{R}}_t(z),dip(z)). \quad (2.2-1)$$

Here $R_a(z)$ is the ACRt conventional apparent resistivity log, $R_t^{(k)}=\text{diag}(R_h^{(k)}, R_h^{(k)}, R_v^{(k)})$, $f_{Ra}(z,\overline{\overline{R}}_t(z),dip(z))$ is a semi-analytical function, z is the measured depth, $\overline{\overline{R}}_t(z)$ is the formation resistivity tensor, and it is expressed as $$\overline{\overline{R}}_t(z) = \sum_{k=1}^{Nlayer} R_t^{(k)} \cdot \prod(z, z_k, z_{k+1}), \quad (2.2-2)$$

Here $z_k$ are the Nlayer-bed formation boundaries, k=1, 2, ..., Nlayer. In one embodiment, the formation relative dip is determined using the following equation:

$$\text{dip}(z) = \sum_{k=1}^{Nlayer} dip^{(k)} \cdot \prod(z, z_k, z_{k+1}). \quad (2.2-3)$$

In one embodiment, the process is configured such that the V1D-TI formation is an Nlayer-bed formation, Nlayer is the total number of the beds, $R_h^{(k)}$ and $R_v^{(k)}$ are the TI resistivities, and $dip^{(k)}$ is the relative dip of the kth layer, and $\prod(z, z_k, z_{k+1})$ is a boxcar function and can be expressed as $$\prod(z,z_k,z_{k+1})=H(z-z_k)-H(z-z_{k+1}). \quad (2.2-4)$$

$H(z-z_k)$ and $H(z-z_{k+1})$ are the two Heaviside step functions (or unit step functions).

Figure 4:
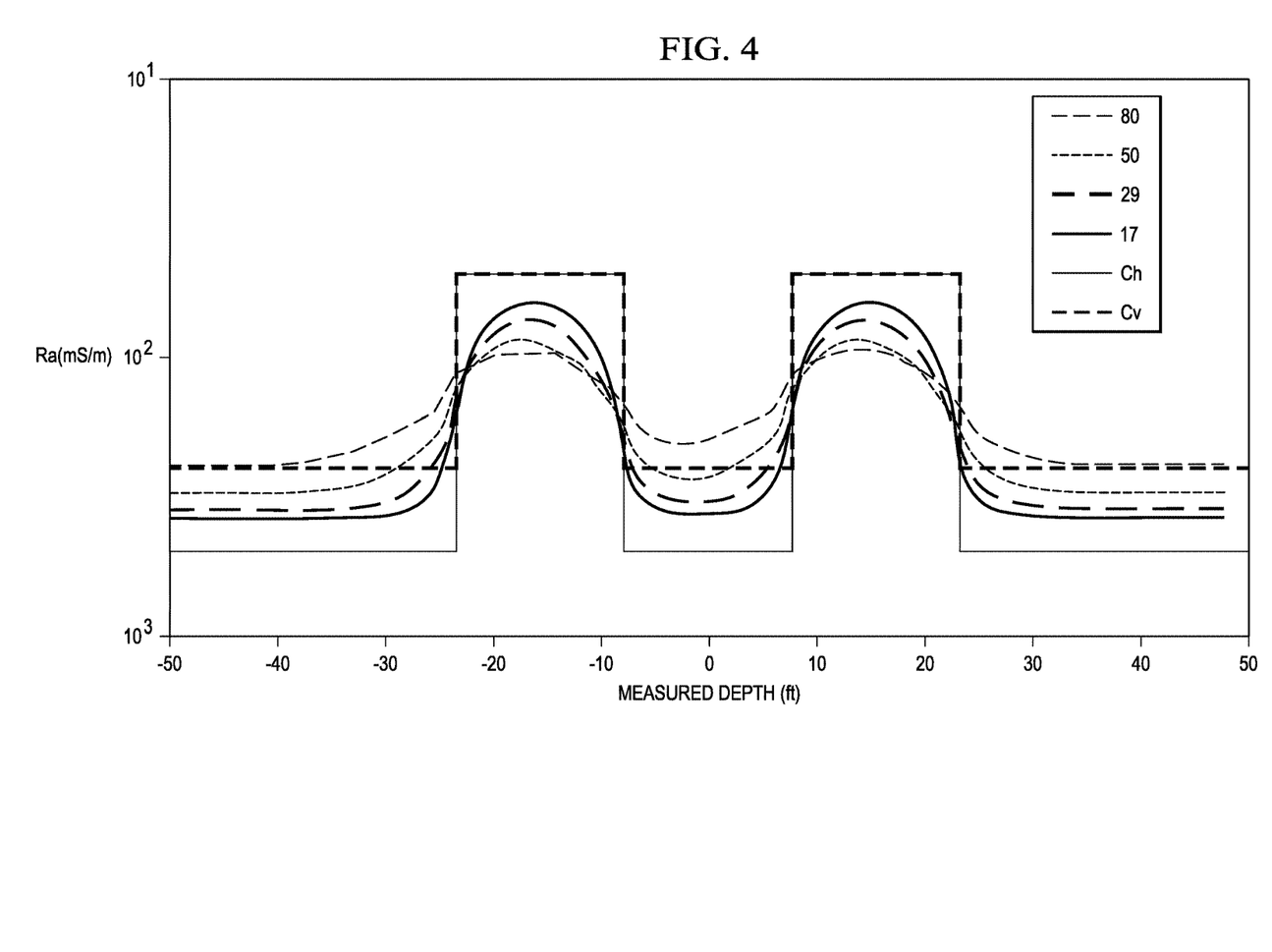
FIG. 4 is a diagram depicting an example of a synthetic log profile of a 4-array conventional induction tool in a 5-layer V1D formation model according to a disclosed embodiment.

FIG. 4 illustrates an example of a graph of Ra logs based on equation 2.2-1. In particular, FIG. 4 illustrates a synthetic log profile of a 4-array conventional induction tool in a 5-layer V1D formation model. Here 80, 50, 29, and 17 represent 4 arrays. Ch represents horizontal conductivity. Cv represents vertical conductivity. As shown in FIG. 4, the Ra logs are dependent on resistivity, bed boundary, and dip.

In one embodiment, the process is configured to evaluate two special cases. One special case is the V1D model at $R_h^{(i)}=R_v^{(i)}$ for each bed (i=1, 2, . . . , Nlayer), then it is reduced to a V1D isotropic formation model. Equation (2.2-1) is reduced as the following:

$$R_a(z) = f_{Ra}(z, R_t(z), \text{dip}(z)). \tag{2.2-5}$$

$$\text{Where } R_t(z) = \sum_{k=1}^{Nlayer} R_t^{(k)} \cdot \prod(z, z_k, z_{k+1}). \tag{2.2-6}$$

Figure 5:
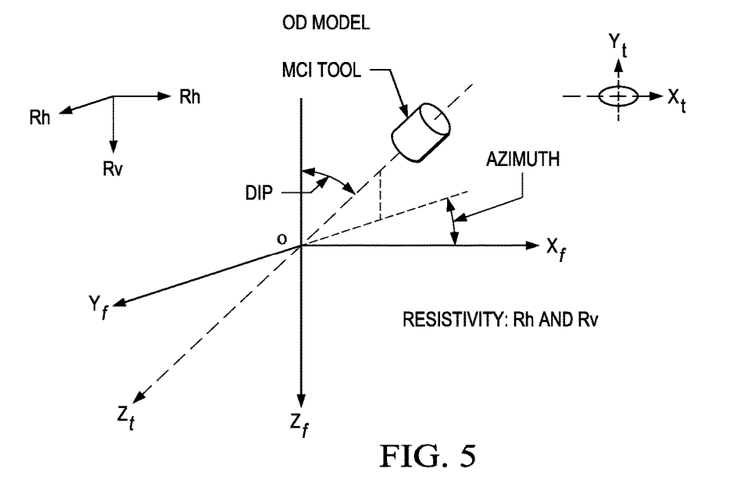
FIG. 5 is a schematic diagram depicting an example of a zero-dimensional (0D) or full-space formation model with TI anisotropy according to a disclosed embodiment.

The second special case is the V1D model at Nlayer=1, then it is a zero-dimensional (OD) or full-space formation model. For example, FIG. 5 illustrates a schematic of a zero-dimensional (OD) or full-space formation model with TI anisotropy. If Rh=Rv, then it is an OD isotropic formation model and equation (2.2-1) is reduced to the following equation:

$$R_a = \frac{k \cdot R_h}{\sqrt{k^2 \cdot \cos^2(\text{dip}) + \sin^2(\text{dip})}} = f_{Ra}(Rh, Rv, \text{dip}). \tag{2.2-7}$$

Here k is the resistivity anisotropy coefficient, which is defined as $$k = \sqrt{\frac{R_v}{R_h}} = \sqrt{R_{vh}}.$$

If k=1, then $Ra=R_h$. If dip=0°, then $Ra=R_h$. If dip=90°, then $Ra=Rgm=\sqrt{R_h \cdot R_v}$, so Ra is the geometric mean of the resistivities because even at 90 degrees dip, some of the horizontal resistivity is still being sensed. In addition, in one embodiment, the process is configured to use the following inequality equation for Ra when dip is between 0 and 90 degrees:

$$R_h \le Ra \le \sqrt{R_h \cdot R_v}. \tag{2.2-8}$$

Figure 6A:
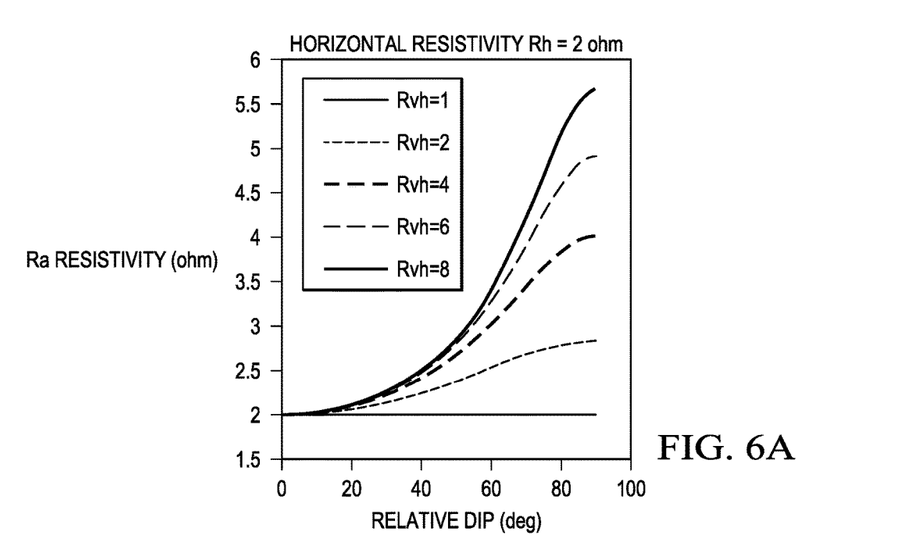
FIG. 6A and FIG. 6B are graphs depicting examples of Ra-resistivity sensitivity to relative dip according to a disclosed embodiment.
Figure 6B:
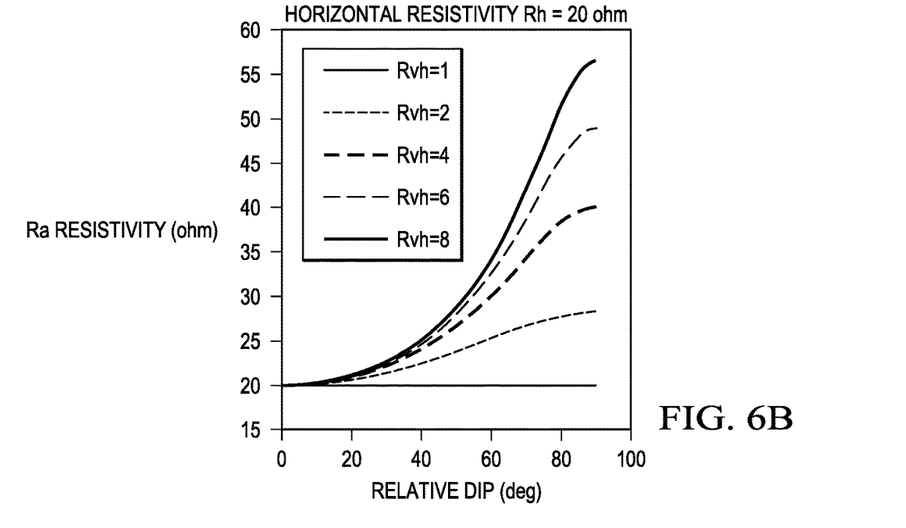

As an example illustration, FIGS. 6A and 6B are graphs depicting Ra-resistivity sensitivity to relative dip and formation resistivity Rh and Rvh (or Rv) in OD formations. In the depicted embodiment illustrated in FIG. 6A, Rh=2 ohm-m. In the depicted embodiment illustrated in FIG. 6B, Rh=20 ohm-m.

In one embodiment, to determine both formation resistivity $\overline{R}_t(z)$ and relative dip dip(z) from the ACRt logs, the process is configured to solve for variables $\overline{R}_t(z)$ and dip(z) in Equation (2.2-9) to minimize the error over the ACRt measured signals and calculated ones from the model (2.2-1).

$$obj_{TI}(z,\overline{R}_t(z),\text{dip}(z))=\min\Sigma[R_a(z)-f_{Ra}(z,\overline{R}_t(z),\text{dip}(z))]^2. \tag{2.2-9}$$

Here $obj_{TI}(z,\overline{R}_t(z),\text{dip}(z))$ is the object function plus the constraints:

$$\overline{R_t^{min}} \le \overline{R}_t(z) \le R_t^{max} \text{ and } \text{dip}_{min} \le \text{dip}(z) \le \text{dip}_{max}. \tag{2.2-9b}$$

In certain embodiments, the process can be configured to solve the above multi-dimensional constrained optimization using various math methods, such as, but not limited to, Gauss-Newton method. Once Rh and Rv are obtained from the ACRt inversion processing, the process is configured to determine $R_{sh}^h$ and $R_{sh}^v$ from the Rh and Rv logs in the pure shale sections. The process can then solve for $V_{lam}$ and $R_{sd}$ from Equations (2.1-1) and (2.1-2). Here $R_{sd}$ is the second solution, denoted as $R_{sd}^{(2)}$.

Alternatively, in one embodiment, if the process is configured to use the model (2.2-5) instead of model (2.2-1), the minimization problem to solve for variables $R_t(z)$ and dip(z) is expressed as $$obj_{iso}(z,R_t(z),\text{dip}(z))=\min\Sigma[R_a(z)-f_{Ra}(z,R_t(z),\text{dip}(z))]^2. \tag{2.2-10}$$

This embodiment assumes that the formation is isotropic. Additionally, this embodiment is able to be used for the dip correction of all ACRt-family logs (ACRt, HACRt, and SACRt logs).

In another embodiment, the process can be configured, at step 308, to perform a determination of reservoir-rock resistivity $R_{sd}$ from ACRt logs and MCI logs. For instance, if both MCI and ACRt logs are available, the Rh and Rv can be obtained from two dip corrections (or dpc) to the ACRt log. According to the OD formation model as shown in Equation (2.2-7), the process can be configured to use the following equations for the dip correction:

$$R_a^{dpc}(\text{dip}=0°)=R_a+\{f_{Ra}(Rh,Rv,\text{dip}=0°)-f_{Ra}(Rh,Rv,\text{dip})\}. \tag{2.3-1}$$

Here $R_a^{dpc}(\text{dip}=0°)$ is the dpc-corrected log at dip=0°, and so $R_a^{dpc}(\text{dip}=0°)=Rh$. And $$R_a^{dpc}(\text{dip}=90°)=R_a+\{f_{Ra}(Rh,Rv,\text{dip}=90°)-f_{Ra}(Rh,Rv,\text{dip})\}. \tag{2.3-2}$$

Here $R_a^{dpc}(\text{dip}=90°)$ is the dpc-corrected log at dip=90°, and so $R_a^{dpc}(\text{dip}=90°)=\sqrt{Rh \cdot Rv}$ from the previous discussion.

In one embodiment, the process is configured with the following equations for performing the determination of both the Rh and Rv:

$$Rh = R_a^{dpc}(\text{dip}=0°). \tag{2.3-3}$$

and $$Rv = \frac{(R_a^{dpc}(\text{dip}=90°))^2}{Rh}. \tag{2.3-4}$$

Once both the Rh and Rv are available, the process is configured to obtain the reservoir-rock resistivity $R_{sd}$ by using Equations (2.1-1) and (2.1-2). Here $R_{sd}$ is the $3^{rd}$ solution, and it is denoted as $R_{sd}^{(3)}$.

In one embodiment, the process, at step 310, may also be configured to perform a determination of $R_{sd}$ using ACRt and porosity logs. For example, in one embodiment, based on equations (2.2-5) and (2.2-10), the formation resistivity $R_t(z)$ and dip(z) are obtained by the inversion of the ACRt data. Once $R_t(z)$ and dip(z) are available, the process is configured to use the current ACRt-dip correction in the FRS software for obtaining $R_a^{dpc}(\text{dip}=0°)$ or Rh (or $C_h$). In one embodiment, the process is configured to determine the laminar shale volume $V_{lam}$ from the porosity logs by using the Thomas-Stieber shale distribution model. The process then is configured to use Equation (2.1-1) for the reservoir-rock resistivity $R_{sd}$, namely, $$C_{sd} = \frac{C_h - V_{lam} \cdot C_{sh}^h}{1 - V_{lam}}, \text{ and so } R_{sd} = \frac{1}{C_{sd}}. \quad (2.4\text{-}1)$$

$$\text{Here } C_h = \frac{1}{R_a^{Apc}(\text{dip}=0°)},$$

and $R_{sd}$ is the 4$^{th}$ solution, and it is denoted as $R_{sd}^{(4)}$.

Referring back to FIG. 3, at step 312, if borehole imager is available, in one embodiment, the process is configured to perform a determination of $R_{sd}$ using macro-resistivity borehole imager and porosity logs. The Macro-resistivity borehole imager has a very higher vertical resolution (VR) compared with the MCI or ACRt logs. For example, the OMRI tool is able to provide a 1-inch VR imager log, but the MCI or ACRt logs have the three different VR logs: 1-ft, 2-ft, and 4-ft resistivity logs.

In one embodiment, the process is configured to assume that the macro-resistivity imager only is sensitive to the vertical resistivity. Thus, the vertical resistivity Rv is expressed as in the laminar formations $$R_v = (1 - V_{lam}) \cdot R_{sd} + V_{lam} \cdot R_{sh}^v. \quad (2.5\text{-}1)$$

And so $R_v$ in equation (2.5-1) has the following relationships with the 1-ft, 2-ft, and 4-ft MCI or ACRt logs $$R_v^{(1ft)} = \quad (2.5\text{-}2)$$
$$\frac{1}{\sum_{i=1}^{12} V^{(i)}} \sum_{i=1}^{12} V^{(i)} R_v^{(i)} = \frac{1}{\sum_{i=1}^{12} V^{(i)}} \sum_{i=1}^{12} V^{(i)} [R_{sd}^{(i)} V_{sd}^{(i)} + R_{sh}^{(i)} V_{sh}^{(i)}].$$

$$R_v^{(12t)} = \quad (2.5\text{-}3)$$
$$\frac{1}{\sum_{i=1}^{12} V^{(i)}} \sum_{i=1}^{24} V^{(i)} R_v^{(i)} = \frac{1}{\sum_{i=1}^{12} V^{(i)}} \sum_{i=1}^{24} V^{(i)} [R_{sd}^{(i)} V_{sd}^{(i)} + R_{sh}^{(i)} V_{sh}^{(i)}].$$

$$R_v^{(4ft)} = \quad (2.5\text{-}4)$$
$$\frac{1}{\sum_{i=1}^{12} V^{(i)}} \sum_{i=1}^{48} V^{(i)} R_v^{(i)} = \frac{1}{\sum_{i=1}^{12} V^{(i)}} \sum_{i=1}^{48} V^{(i)} [R_{sd}^{(i)} V_{sd}^{(i)} + R_{sh}^{(i)} V_{sh}^{(i)}].$$

If the process is configured to determine $V_{lam}$ from the porosity logs, the process can determine $R_{sd}$ using the following equation:

$$R_{sd} = \frac{R_v - V_{lam} \cdot R_{sh}^v}{1 - V_{lam}}. \quad (2.5\text{-}5)$$

Here $R_{sd}$ is the 5$^{th}$ solution of the sand resistivity, and it is denoted as $R_{sd}^{(5)}$.

Alternatively, in certain embodiments, the process may also be configured to calculate $R_{sd}$ using other various combinations at step 314. For example, in some embodiments, the process is configured to have different combinations among MCI, ACRt, imager, and conventional logs for performing the determination of the sand resistivity $R_{sd}$. Conventional logs refers to the commonly used logs in oil and gas exploration and production such as, but not limited to, neutron log density log, and gamma ray log used in well logging. As an example, in one embodiment, the process is configured to determine $R_{sd}$ using the combination of ACRt and imager.

At step 316, the process is configured to perform data quality assessments of the calculated $R_{sd}$. For example, based on the above disclosed methods for determining $R_{sd}$ (i.e., N ways for the sand resistivity, $R_{sd}^{(1)}, R_{sd}^{(2)}, \ldots, R_{sd}^{(N)}$), in one embodiment, the process is configured to calculate the standard deviation (variance) or its weighted one for the data-quality assessment of the calculated $R_{sd}$. In the case where the sand resistivity data set $(R_{sd}^{(1)}, R_{sd}^{(2)}, \ldots, R_{sd}^{(l)}, \ldots, R_{sd}^{(N)})$ has the same weight for each $R_{sd}^{(l)}$, the standard deviation (SD) with a q-norm is given by $$\Delta_{SD}^{(1)} = \left(\frac{1}{N}\sum_{l=1}^{N}\left(|R_{sd}^{(l)} - \overline{R_{sd}}|\right)^q\right)^{\frac{1}{q}}, \quad (2.6\text{-}1)$$

where $\overline{R_{sd}} = \frac{1}{N}\sum_{l=1}^{N}\left(R_{sd}^{(l)}\right)$.

If, instead of having equal weights, the data set has different weights, for example, let $R_{sd}^{(1)}$ have weight $p_1$, $R_{sd}^{(2)}$ have weight $p_2, \ldots$, and $R_{sd}^{(N)}$ have weight $p_N$. In this case, the SD will be given by $$\Delta_{SD}^{(2)} = \left(\sum_{l=1}^{N} p_l \left(|R_{sd}^{(l)} - \overline{R_{sd}}|\right)^q\right)^{\frac{1}{q}}, \quad (2.6\text{-}2)$$

where $\overline{R_{sd}} = \sum_{l=1}^{N}\left(p_l \cdot R_{sd}^{(l)}\right)$.

In certain embodiments, the process is configured to use the normalized SD with the mean $\overline{R_{sd}}$. In this case, the SD will be the ratio of the SD and the mean $\overline{R_{sd}}$, namely $$\Delta_{NSD}^{(2)} = \frac{\left(\sum_{l=1}^{N} p_l \cdot \left(|R_{sd}^{(l)} - \overline{R_{sd}}|\right)^q\right)^{\frac{1}{q}}}{\overline{R_{sd}}} \times 100\%. \quad (2.6\text{-}3)$$

The above data quality assessment is independent of the measurement units.

For example, if q=1, then the process is configured with the following equation for the SD with a 1-norm:

$$\Delta_{NSD}^{(2)} = \frac{\left(\sum_{l=1}^{N} p_l \cdot |R_{sd}^{(l)} - \overline{R_{sd}}|\right)}{\overline{R_{sd}}} \times 100\%. \quad (2.6\text{-}3a)$$

Obviously, the smaller of the normalized SD, and the better of the data quality of the calculated $R_{sd}$. Hence, in one embodiment, the process is configured to use the SD as the quality indicator for the calculated parameters.

In addition, in one embodiment, the process is configured with the following equations for calculating the relative errors for each calculated sand resistivity data $(R_{sd}^{(1)}, R_{sd}^{(2)}, \ldots, R_{sd}^{(l)} \ldots, R_{sd}^{(N)})$ from (2.6-3a):

$$E_{rel}^{(l)} = \frac{|R_{sd}^{(l)} - \overline{R_{sd}}|}{\overline{R_{sd}}} \times 100\%, l = 1, 2, \ldots, N. \quad (2.6\text{-}4)$$

At step 318, the process is configured to output the one or more calculated $R_{sd}$ with process 300 terminating thereafter. The calculated $R_{sd}$ may then be used for other applications such as, but not limited to, 3D Earth model application.

Figure 7A:
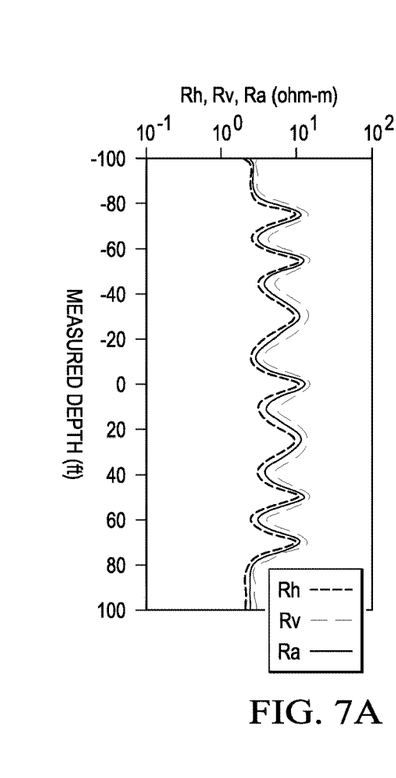
Figure 7B:
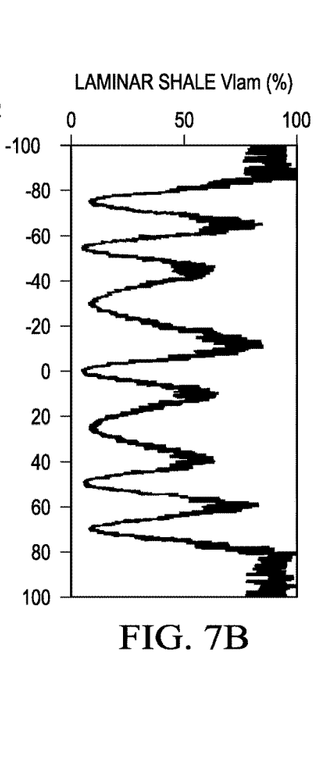
Figure 7C:
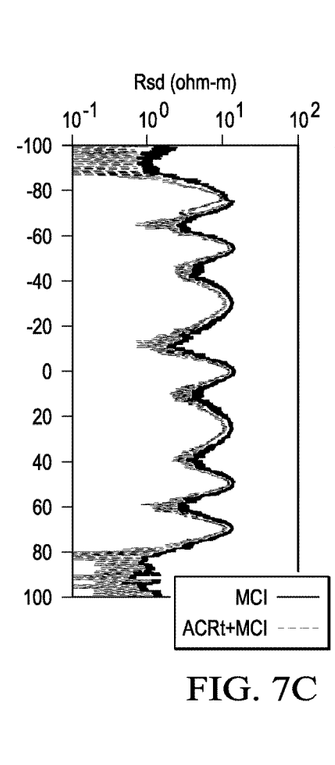
Figure 7D:
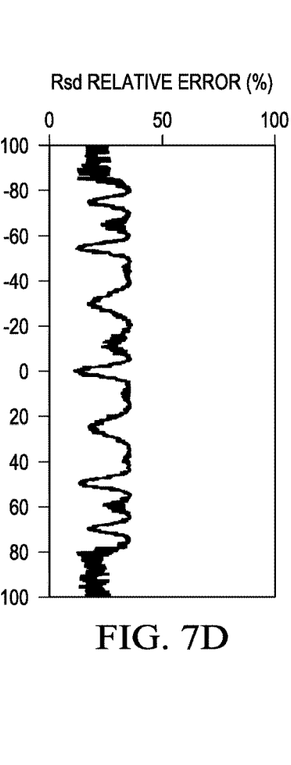

FIGS. 7A-7D illustrate a synthetic data example applied to the methods disclosed herein. In the depicted example, FIG. 7A illustrates the plots for horizontal resistivity Rh log, vertical resistivity Rv log, and conventional induction Ra log at dip=60 degrees. All three logs are added into a max random error of 20%. FIG. 7B illustrates the calculated laminar shale volume. FIG. 7C illustrates the plots for both calculated Rsd using MCI only using equations (2.1-1) and (2.1-2) and calculated Rsd using ACRt and MCI using equations (2.3-1)-(2.3-4). FIG. 7D illustrates the normalized SD log based on the relative error of two Rsd logs. As shown in FIG. 7D, the max SD is less than about 25%, thus indicating that this processing method is not very sensitive to the error in the logs Rh, Rv, and Ra.

Figure 8:
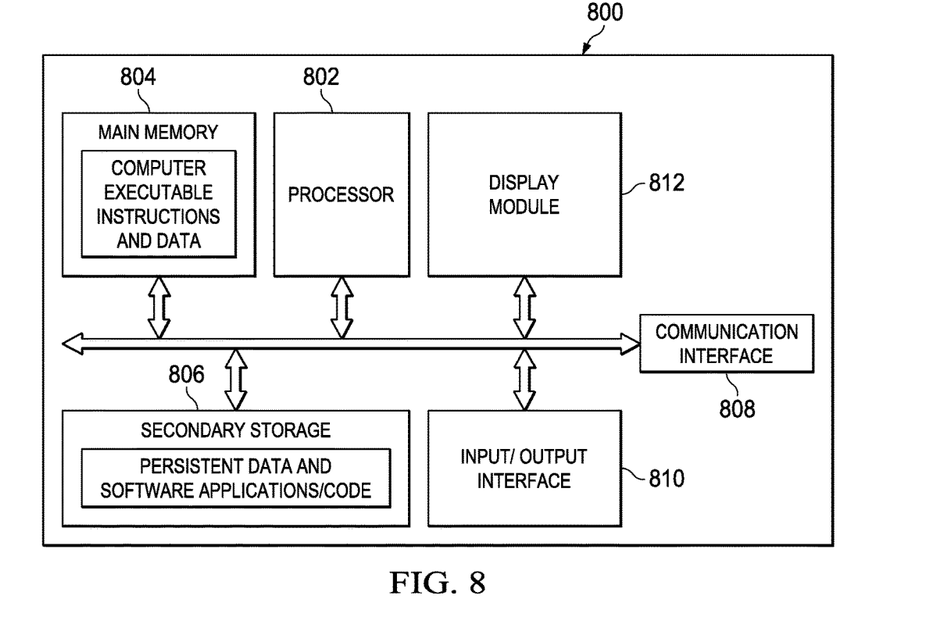
FIG. 8 is a schematic diagram illustrating a system that may be used for assessing the data-quality of the calculated reservoir-rock resistivity $R_{sd}$ according to an exemplary embodiment.

FIG. 8 is a schematic diagram illustrating a system 800 that may be used for assessing the data-quality of the calculated reservoir-rock resistivity $R_{sd}$ according to an exemplary embodiment. In certain embodiments, the system 800 may be located at the well site and configured to receive the MCI data and other log sensor data directly from the sensors during the drilling process. In addition to or alternatively, the system 800 may be configured to receive the MCI data and other log sensor data after the drilling process. The system 800 may also be located off-site of the drilling site. The MCI data and other log sensor data may be sent to the system 800 over a secure private or even public network.

In the depicted embodiment, the system 800 includes a processor 802, main memory 804, secondary storage unit 806, an input/output interface module 810, and a communication interface module 808. The processor 802 may be any number of or type of processors capable of executing instructions for performing the features and functions of the disclosed embodiments.

The input/output interface module 810 enables the system 800 to receive user input (e.g., keyboard, mouse, touchscreen) and output information to one or more devices such as, but not limited to, printers, an external data storage drive, and audio and video components.

The communication interface module 808 enables the system 800 to communicate data with other devices over a public or private, wired or wireless network. Non-limiting examples of communication types that may be employed include, but not limited to, near field communication, Wi-Fi communication, cellular data communication, or Ethernet communication. For example, in one embodiment, the system 800 may communicate with the receivers over a secured wireless communication channel to receive seismic data or other sensor log(s) data. In some embodiments, communication between the system 800 and other devices may utilize, but not limited to, a local area network, a wide area network, or the Internet.

The system 800 may optionally include a graphics or display module 812 to enable information to be displayed on an internal or external display device. For instance, the display module 812 may include instructions or hardware for providing touchscreen capabilities for receiving user input via the display device. In certain embodiments, the display module 812 may also include instructions for enabling multi-touch functionalities associated with a display device. In some embodiments, the display module 812 may include its own graphics processor for the processing and rendering of images or videos.

Main memory 804 is volatile memory that stores currently executing or prefetched instructions/data for execution by the processor 802. Secondary storage unit 806 is non-volatile memory. Examples of secondary storage unit 806 may include any type of data storage component such as a hard drive, a flash drive, or memory card. The secondary storage unit 806 is configured to store persistent data such as, but not limited to, computer executable instructions associated with software applications or an operating system. These instructions are passed from the secondary storage unit 806 to main memory 804 for enabling execution by the processor 802.

As an example, in one embodiment, the system 800 is configured to execute a program, script, or algorithm for assessing the data-quality of the calculated reservoir-rock resistivity $R_{sd}$ with integrated interpretation of MCI, conventional resistivity such as ACRt, and macro-resistivity imager logs in laminar formations in accordance with the example flowchart shown in FIG. 3. Additionally, as disclosed herein, the system 800 may be configured to execute a program, script, or algorithm for calculating reservoir-rock resistivity $R_{sd}$ using the various methods disclosed herein if the MCI is not available.

In addition to the disclosed methods and systems, the disclosed embodiments may also be embodied in a computer program product, comprising a non-transitory computer usable medium having a computer readable program code embodied therein.

It should be apparent from the foregoing that embodiments of an invention having significant advantages over current technology have been provided. For example, advantages of the disclosed embodiments when compared with all current methods include providing both the reservoir resistivity and its data quality, which is mandatory for the product deliverable. While the embodiments are shown in only a few forms, the embodiments are not limited but are susceptible to various changes and modifications without departing from the spirit thereof.

Further, the steps of the methods described herein may be carried out in any suitable order, or simultaneously where appropriate. Thus, the scope of the claims should not necessarily be limited by the above description, which is merely provided as examples to enable one of ordinary skill in the art to practice the appended claims.

Moreover, while the appended claims recite specific combinations of features of the disclosed embodiments, other combinations of the claims may include one or more of the disclosed features combine in any number of combinations. In other words, it is intended that the disclosed embodiments support amendments to the appended claims or new claims that combine or omit various steps or features of the disclosed embodiments in any combination other than those specifically recited in the current appended claims. For example, the inventions disclosed herein include, but are not limited to the following embodiments.

Example Embodiments: A method, system, and/or computer program product for assessing the data-quality of at least one of a calculated reservoir-rock resistivity $R_{sd}$ and reservoir-rock conductivity $C_{sd}$ in laminar formations, the method, system, and/or computer program product comprising instructions that are configured to perform one or more, in any combination, of the following clauses or portions thereof:

Clause 1: receiving multi-component induction (MCI) data and other sensor logs data associated with a laminar formation.

Clause 2: determining a set of calculated reservoir-rock resistivity $R_{sd}$ using at least one of the multi-component induction (MCI) data and other sensor logs data.

Clause 3: determining a set of calculated reservoir-rock conductivity $C_{sd}$ using at least one of the multi-component induction (MCI) data and other sensor logs data.

Clause 4: performing data quality assessments of the set of calculated reservoir-rock resistivity $R_{sd}$.

Clause 5: performing data quality assessments of the set of calculated reservoir-rock conductivity $C_{sd}$.

Clause 6: determining a reservoir-rock resistivity $R_{sd}$ from the horizontal resistivity $R_h$ and vertical resistivity $R_v$ logs based on the multi-component induction (MCI) data.

Clause 7: determining a reservoir-rock conductivity $C_{sd}$ from the horizontal resistivity $C_h$ and vertical resistivity $C_v$ logs based on the multi-component induction (MCI) data.

Clause 8: determining a reservoir-rock resistivity $R_{sd}$ from array compensated true resistivity (ACRt) log data only.

Clause 9: determining a reservoir-rock conductivity $C_{sd}$ from array compensated true resistivity (ACRt) log data only.

Clause 10: determining a reservoir-rock resistivity $R_{sd}$ from array compensated true resistivity (ACRt) log data and the MCI data.

Clause 11: determining a reservoir-rock conductivity $C_{sd}$ from array compensated true resistivity (ACRt) log data and the MCI data.

Clause 12: determining a reservoir-rock resistivity $R_{sd}$ from array compensated true resistivity (ACRt) log data and porosity logs.

Clause 13: determining a reservoir-rock conductivity $C_{sd}$ from array compensated true resistivity (ACRt) log data and porosity logs.

Clause 14: determining a reservoir-rock resistivity $R_{sd}$ from macro-resistivity borehole imager logs and porosity logs.

Clause 15: determining a reservoir-rock conductivity $C_{sd}$ from macro-resistivity borehole imager logs and porosity logs.

Clause 16: determining a reservoir-rock resistivity $R_{sd}$ from a combination of two or more selected from the group of array compensated true resistivity (ACRt) log data, the MCI data, macro-resistivity borehole imager logs and porosity logs, and conventional logs.

Clause 17: determining a reservoir-rock conductivity $C_{sd}$ from a combination of two or more selected from the group of array compensated true resistivity (ACRt) log data, the MCI data, macro-resistivity borehole imager logs and porosity logs, and conventional logs.

Clause 18: calculating a standard deviation of the set of calculated reservoir-rock resistivity $R_{sd}$, and using the standard deviation as a quality indicator for the set of calculated reservoir-rock resistivity $R_{sd}$.

Clause 19: calculating a standard deviation of the set of calculated reservoir-rock conductivity $C_{sd}$, and using the standard deviation as a quality indicator for the set of calculated reservoir-rock conductivity $C_{sd}$.

Clause 20: calculating a relative error for each calculated $R_{sd}$ in the set of calculated reservoir-rock resistivity $R_{sd}$.

Clause 21: calculating a relative error for each calculated $C_{sd}$ in the set of calculated reservoir-rock conductivity $C_{sd}$.

The claims of the current application are as follows:

The invention claimed is:

1. A computer-implemented method for use with a downhole logging tool for assessing the data-quality of at least one of a calculated reservoir-rock resistivity R_sd and reservoir-rock conductivity C_sd in laminar formations, the computer-implemented method comprising:
receiving from a multi-component induction (MCI) tool MCI data associated with a laminar formation and data of sensor logs associated with the laminar formation;
determining at least one of a set of calculated reservoir-rock resistivity R_sd and a set of calculated reservoir-rock conductivity C_sd using at least one of the multi-component induction (MCI) data and other sensor logs data;
performing data quality assessments using a standard deviation of the at least one of the set of calculated reservoir-rock resistivity R_sd and the set of calculated reservoir-rock conductivity C_sd; and
using the standard deviation as a quality indicator for the set of calculated reservoir-rock resistivity R_sd;
wherein the calculated reservoir-rock resistivity R_sd and reservoir-rock conductivity C_sd are calculated using at least one of a bimodal rock-physics model, induction-logging forward model, V1D isotropic formation model, and OD isotropic formation model.

2. The computer-implemented method according to claim 1, wherein determining the set of calculated reservoir-rock resistivity R_sd using at least one of the multi-component induction (MCI) data and other sensor logs data comprises determining a first reservoir-rock resistivity R_sd from the horizontal resistivity R_h and vertical resistivity R_v logs based on the multi-component induction (MCI) data.

3. The computer-implemented method according to claim 1, wherein determining the set of calculated reservoir-rock resistivity R_sd using at least one of the multi-component induction (MCI) data and other sensor logs data comprises determining a reservoir-rock resistivity R_sd from array compensated true resistivity (ACRt) log data only.

4. The computer-implemented method according to claim 1, wherein determining the set of calculated reservoir-rock resistivity R_sd using at least one of the multi-component induction (MCI) data and other sensor logs data comprises determining a reservoir-rock resistivity R_sd from array compensated true resistivity (ACRt) log data and the MCI data.

5. The computer-implemented method according to claim 1, wherein determining the set of calculated reservoir-rock resistivity R_sd using at least one of the multi-component induction (MCI) data and other sensor logs data comprises determining a reservoir-rock resistivity R_sd from array compensated true resistivity (ACRt) log data and porosity logs.

6. The computer-implemented method according to claim 1, wherein determining the set of calculated reservoir-rock resistivity R_sd using at least one of the multi-component induction (MCI) data and other sensor logs data comprises determining a reservoir-rock resistivity R_sd from macro-resistivity borehole imager logs and porosity logs.

7. The computer-implemented method according to claim 1, wherein determining the set of calculated reservoir-rock resistivity R_sd using at least one of the multi-component induction (MCI) data and other sensor logs data comprises determining a reservoir-rock resistivity R_sd from a combination of two or more selected from the group of array compensated true resistivity (ACRt) log data, the MCI data, macro-resistivity borehole imager logs and porosity logs, and conventional logs.

8. The computer-implemented method according to claim 2, wherein determining the set of calculated reservoir-rock resistivity R_sd using at least one of the multi-component induction (MCI) data and other sensor logs data further comprises determining a second reservoir-rock resistivity R_sd from array compensated true resistivity (ACRt) log data only.

9. The computer-implemented method according to claim 8, wherein determining the set of calculated reservoir-rock resistivity R_sd using at least one of the multi-component induction (MCI) data and other sensor logs data further comprises determining a third reservoir-rock resistivity R_sd from array compensated true resistivity (ACRt) log data and the MCI data.

10. The computer-implemented method according to claim 9, wherein determining the set of calculated reservoir-rock resistivity R_sd using at least one of the multi-component induction (MCI) data and other sensor logs data further comprises determining a fourth reservoir-rock resistivity R_sd from array compensated true resistivity (ACRt) log data and porosity logs.

11. The computer-implemented method according to claim 10, wherein determining the set of calculated reservoir-rock resistivity R_sd using at least one of the multi-component induction (MCI) data and other sensor logs data further comprises determining a fifth reservoir-rock resistivity R_sd from macro-resistivity borehole imager logs and porosity logs.

12. A system for use with a downhole logging tool for assessing the data-quality of at least one of a calculated reservoir-rock resistivity R_sd and reservoir-rock conductivity C_sd in laminar formations, the system comprising:
    a data storage component for storing data and executable instructions;
    a processor configured to execute the executable instructions to:
    receive from a multi-component induction (MCI) tool MCI data associated with a laminar formation and data of sensor logs associated with the laminar formation;
    determine at least one of a set of calculated reservoir-rock resistivity R_sd and a set of calculated reservoir-rock conductivity C_sd using at least one of the multi-component induction (MCI) data and other sensor logs data; and
    perform data quality assessments using a standard deviation of the at least one of the set of calculated reservoir-rock resistivity R_sd and the set of calculated reservoir-rock conductivity C_sd; and
    using the standard deviation as a quality indicator for the set of calculated reservoir-rock resistivity R_sd;
    wherein the calculated reservoir-rock resistivity R_sd and reservoir-rock conductivity C_sd are calculated using at least one of a bimodal rock-physics model, induction-logging forward model, V1D isotropic formation model, and OD isotropic formation model.

13. The system according to claim 12, wherein the executable instructions to determine the at least one of a set of calculated reservoir-rock resistivity R_sd and a set of calculated reservoir-rock conductivity C_sd using at least one of the multi-component induction (MCI) data and other sensor logs data comprises determining at least one of a first reservoir-rock resistivity R_sd from the horizontal resistivity R_h and vertical resistivity R_v logs based on the multi-component induction (MCI) data, and a first reservoir-rock conductivity C_sd from the horizontal conductivity C_h and vertical conductivity C_v logs based on the multi-component induction (MCI) data.

14. The system according to claim 12, wherein the executable instructions to determine the at least one of a set of calculated reservoir-rock resistivity R_sd and a set of calculated reservoir-rock conductivity C_sd using at least one of the multi-component induction (MCI) data and other sensor logs data comprises determining at least one of a reservoir-rock resistivity R_sd and a reservoir-rock conductivity C_sd from array compensated true resistivity (ACRt) log data only.

15. The system according to claim 12, wherein the executable instructions to determine the at least one of a set of calculated reservoir-rock resistivity R_sd and a set of calculated reservoir-rock conductivity C_sd using at least one of the multi-component induction (MCI) data and other sensor logs data comprises determining at least one of a reservoir-rock resistivity R_sd and a reservoir-rock conductivity C_sd from array compensated true resistivity (ACRt) log data and the MCI data.

16. The system according to claim 12, wherein the executable instructions to determine the at least one of a set of calculated reservoir-rock resistivity R_sd and a set of calculated reservoir-rock conductivity C_sd using at least one of the multi-component induction (MCI) data and other sensor logs data comprises determining at least one of a reservoir-rock resistivity R_sd and a reservoir-rock conductivity C_sd from array compensated true resistivity (ACRt) log data and porosity logs.

17. The system according to claim 12, wherein the executable instructions to determine the at least one of a set of calculated reservoir-rock resistivity R sd and a set of calculated reservoir-rock conductivity C_sd using at least one of the multi-component induction (MCI) data and other sensor logs data comprises determining at least one of a reservoir-rock resistivity R_sd and a reservoir-rock conductivity C_sd from macro-resistivity borehole imager logs and porosity logs.

18. A computer program product for use with a downhole logging tool, comprising a non-transitory computer usable medium having a computer readable program code embodied therein, said computer readable program code adapted to be executed to:
    receive from a multi-component induction (MCI) tool MCI data associated with a laminar formation and data of sensor logs associated with the laminar formation;
    determine at least one of a set of calculated reservoir-rock resistivity R_sd and a set of calculated reservoir-rock conductivity C_sd using at least one of the multi-component induction (MCI) data and other sensor logs data;
    perform data quality assessments using a standard deviation of the at least one of the set of calculated reservoir-rock resistivity R_sd and the set of calculated reservoir-rock conductivity C_sd; and
    using the standard deviation as a quality indicator for the set of calculated reservoir-rock resistivity R_sd;
    wherein the calculated reservoir-rock resistivity R_sd and reservoir-rock conductivity C_sd are calculated using at least one of a bimodal rock-physics model, induction-logging forward model, V1D isotropic formation model, and OD isotropic formation model.

* * * * *